United States Patent
Fouquet

(10) Patent No.: US 8,195,125 B2
(45) Date of Patent: Jun. 5, 2012

(54) DEVICE AND METHOD FOR REDIRECTING TRAFFIC

(75) Inventor: Matthieu Fouquet, Meudon (FR)

(73) Assignee: Bouygues Telecom, Boulogne-Billancourt (FR)

( * ) Notice: Subject to any disclaimer, the term of this patent is extended or adjusted under 35 U.S.C. 154(b) by 509 days.

(21) Appl. No.: 12/307,475

(22) PCT Filed: Jun. 28, 2007

(86) PCT No.: PCT/FR2007/001097
§ 371 (c)(1),
(2), (4) Date: May 7, 2009

(87) PCT Pub. No.: WO2008/003848
PCT Pub. Date: Jan. 10, 2008

(65) Prior Publication Data
US 2009/0318115 A1    Dec. 24, 2009

(30) Foreign Application Priority Data
Jul. 6, 2006    (FR) ..................................... 06 06174

(51) Int. Cl.
*H04M 1/66*    (2006.01)
(52) U.S. Cl. ..................... 455/411; 455/414.1; 455/433; 455/432.1; 455/432.3; 455/435.1
(58) Field of Classification Search ............... 455/432.1, 455/435.1, 552.1, 411, 414.1, 433, 432.3
See application file for complete search history.

(56) References Cited

U.S. PATENT DOCUMENTS

| | | | | |
|---|---|---|---|---|
| 6,697,620 | B1 * | 2/2004 | Lamb et al. | 455/432.1 |
| 7,139,570 | B2 * | 11/2006 | Elkarat et al. | 455/432.3 |
| 2004/0072578 | A1 | 4/2004 | Keutmann et al. | |
| 2004/0132449 | A1 | 7/2004 | Kowarsch | |
| 2004/0157585 | A1 * | 8/2004 | Sashihara | 455/411 |
| 2006/0245406 | A1 * | 11/2006 | Shim | 370/338 |
| 2007/0054658 | A1 | 3/2007 | Guyard et al. | |
| 2007/0087747 | A1 * | 4/2007 | Adamany et al. | 455/432.1 |
| 2008/0175178 | A1 | 7/2008 | Patin et al. | |
| 2008/0220774 | A1 | 9/2008 | Fouquet | |
| 2009/0082019 | A1 * | 3/2009 | Marsico | 455/435.2 |
| 2011/0182214 | A1 * | 7/2011 | Hoffmann et al. | 370/277 |

FOREIGN PATENT DOCUMENTS

| | | |
|---|---|---|
| EP | 1 463 366 A2 | 9/2004 |
| WO | 00/79827 A1 | 12/2000 |
| WO | 01/95655 A1 | 12/2001 |
| WO | 02/069660 A1 | 9/2002 |
| WO | 2005/107281 A2 | 11/2005 |

* cited by examiner

*Primary Examiner* — Danh Le
*Assistant Examiner* — Khai M Nguyen
(74) *Attorney, Agent, or Firm* — Harness, Dickey & Pierce, P.L.C.

(57) ABSTRACT

The application pertains to a mobile telephone network architecture comprising an intermediate item of equipment positioned in said visiting network, said intermediate item of equipment comprising: reception means devised to receive data from a visit switching item of equipment; recording means devised to record said data; connection request means devised to send a request relating to an item of equipment for switching membership on the basis of said data; connection simulation means devised to provide said visit switching item of equipment with authorization to connect a user to a visiting network.

13 Claims, 4 Drawing Sheets

DEVICE AND METHOD FOR REDIRECTING TRAFFIC

CROSS-REFERENCE TO RELATED APPLICATIONS

This application is a National Phase Entry of International Application No. PCT/FR2007/001097, filed Jun. 28, 2007, claiming priority to French Patent Application No. 06/06174, filed Jul. 6, 2006, both of which are incorporated herein by reference.

BACKGROUND AND SUMMARY

The present invention relates to a device and a method, as well as to a network architecture, for redirecting traffic within a mobile telephone network.

Many mobile telephone networks currently offer roaming services, allowing users who have subscribed to the service to continue to receive telephone services during trips abroad. In this way, the user can use any mobile telephone network with no specific criteria in terms of prices or better links, and to do so in an entirely random manner. For commercial reasons, certain operators have set up devices and methods for redirecting traffic in order to favour the tracking of their roaming subscribers in a given country, so that they are led to use the services provided by one operator over another.

In this regard, the prior art knows a device such as described in patent application EP1463366 relating to a roaming service, which is part of a mobile telephone network comprising an HPLMN or Home Public Land Mobile Network, and a VPLMN or Visited Public Land Mobile Network, both of which are connected by an SS7 transport network, which is a Code 7 semaphore signalling network. This HPLMN network comprises a preference unit. This preference unit probes data exchanges between the visited network and the user's home network, meaning that it filters data exchanges between an HLR, Home Location Register, which contains data relating to a customer, and an MSC/VLR, which is a switching device containing the data of the user within its coverage zone transmitted by the HLR. In this way, it captures a tracking request sent by the MSC/VLR from the visited network VPLMN to the HLR of the user's home network HPLMN. This preference unit comprises a database which it consults in order to check that the network is included in its list of favourite networks. If so, it transmits the captured tracking request to the HLR; if not, this preference unit will send a negative response to the tracking request to the MSC/VLR. Upon receiving this negative response, the MSC/VLR will refuse the connection to the mobile terminal, which will then try to connect to another VPLMN network. In this way, the preference unit will therefore redirect the traffic and can send a positive message to the MSC/VLR during another connection by the mobile terminal to a VPLMN network referenced as a partner by this preference unit, even when no roaming agreement has been signed. The disadvantage of such a device is that it cannot redirect traffic if an interoperability problem exists between the VPLMN and HPLMN networks, since in such a context the preference unit, device which manages the redirection of traffic, is no longer in contact with the visited network.

The present invention aims to solve the disadvantages of the prior art. One aim of the invention is to guarantee continuity of service to a mobile terminal, even in the event of interoperability problems between the HPLMN and VPLMN networks. For this purpose, the present invention relates initially to a mobile telephone network architecture comprising at least one first home network and a second visited network, said visited network comprising at least one visited switching device, said home network comprising at least one home switching device, said visited switching device being capable of receiving data relating to a user in said visited network and of transmitting said data to said home switching device, said home switching device being capable of recording said data and authenticating and tracking said user on the basis of said data, said architecture comprising an intermediate device positioned in said visited network, said intermediate device comprising:
  reception means devised to receive said data from said visited switching device;
  recording means devised to record said data;
  connection request means devised to send a request to said home switching device on the basis of said data;
    connection simulation means devised to supply said visited switching device with an authorisation to connect said user to said visited network.

The configuration of this network architecture offers the advantage of comprising within the visited network an intermediate device which carries all data exchanges between the switching devices of the home and visited networks. The position of this device and the means that it include allow it to guarantee continuity of service in the event of an interoperability problem.

The invention also relates to a method of managing a network architecture, said architecture comprising at least one first home network and a second visited network, said visited network comprising at least one visited switching device, said home network comprising at least one home switching device, said visited switching device being capable of receiving data from a user in said visited network and of transmitting said data to said home switching device, said home switching device being capable of recording said data and of authenticating and tracking said user on the basis of said data, said method comprising steps consisting of:
  receiving said data from said visited switching device;
  recording said data;
  sending a request to said home switching device on the basis of said data;
    supplying said visited switching device with an authorisation to connect said user to said visited network.

In one embodiment of the invention, it includes, in the event of an authentication failure by said home switching device following said request, a step consisting of:
  analysing said data received by said intermediate device;
  authorising the authentication.
This step allows a user of the visited network to receive mobile telephone service even when the authentication of his/her mobile terminal is not possible, for example following the non-availability of the home network switching device. In this case it is the intermediate device that authorises the authentication.

In another embodiment of the invention, it includes, in the event of a tracking failure by said home switching device following said request, a step consisting of:
  analysing said data received by said intermediate device;
  authorising the tracking.
This step allows a user of the visited network to receive mobile telephone service even when the tracking of his/her mobile terminal is not possible. In this case it is the intermediate device that authorises the tracking.

The invention also relates to an intermediate device comprised within a mobile telephone network architecture including at least one first home network and a second visited network, said visited network comprising at least one visited switching device, said home network comprising at least one home switching device, said visited switching device being capable of receiving data relating to a user within said visited network and of transmitting said data to said home switching device, said home switching device being capable of recording said data and of authenticating and tracking said user on the basis of said data, intermediate device including:

reception means devised to receive said data from said visited switching device;

recording means devised to record said data;

connection request means devised to send a request to said home switching device on the basis of said data;

connection simulation means devised to supply said visited switching device with an authorisation to connect said user to said visited network.

This intermediate device has the advantage, on the basis of the means it comprises, of being replaceable with the visited network switching device, but also with the home network switching device, and thus of being able to guarantee mobile telephone service in the event of an interoperability problem.

BRIEF DESCRIPTION OF DRAWINGS

One embodiment of the invention is described below in relation to the appended figures.

DETAILED DESCRIPTION

Figure 1:
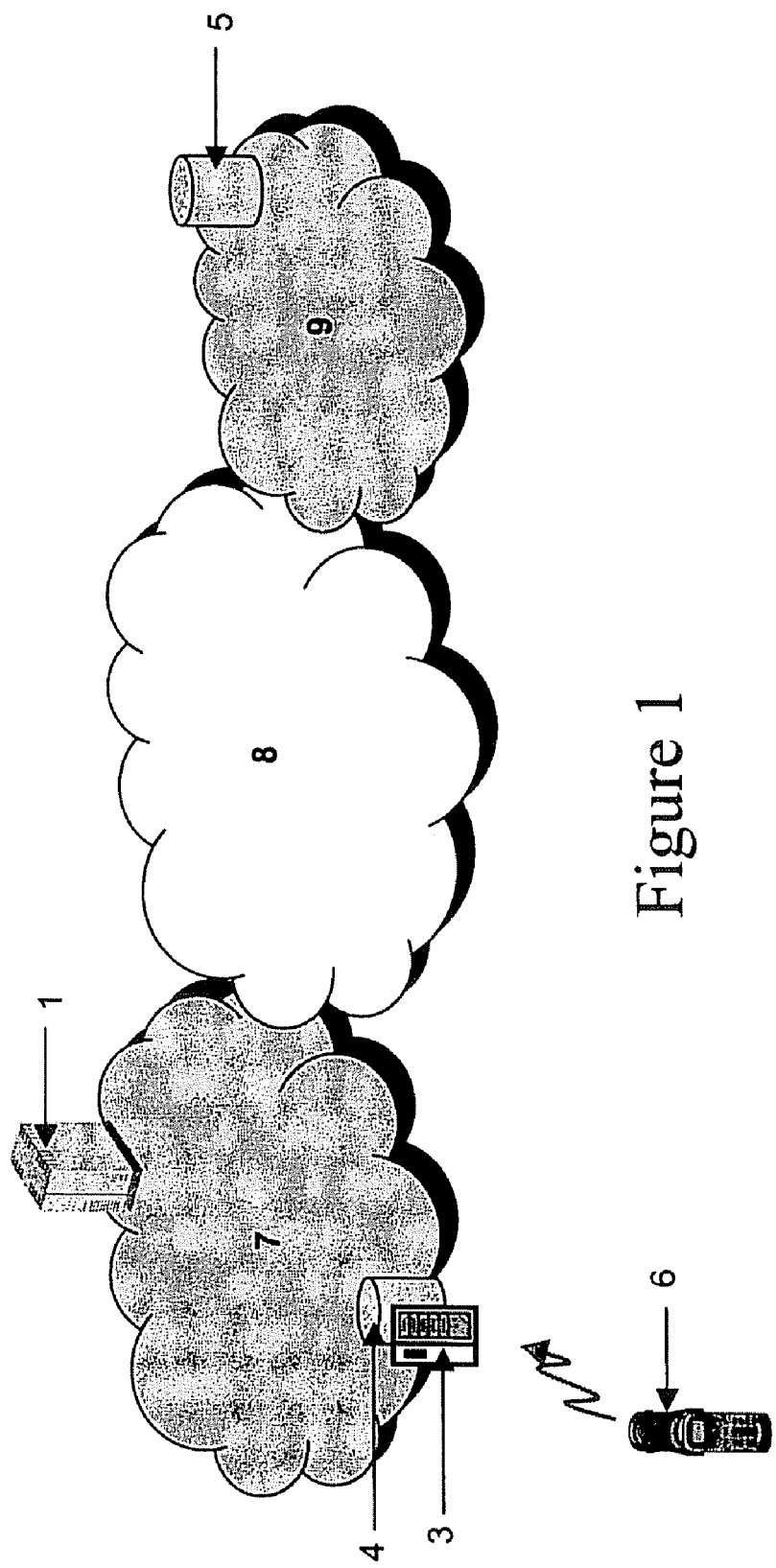
FIG. 1 depicts the architecture of a mobile telephone network.

In one embodiment, the invention relates to a roaming architecture of a mobile telephone network. This architecture includes HPLMN and VPLMN networks, which respectively refer to the user's home network 9 and to a network 7 visited by a user. In addition, this architecture includes an SS7 transport network 8 (Code 7 semaphore signalling network), which provides the link between the HPLMN 9 and VPLMN 7 networks.

This HPLMN network 9 comprises a group of GSM devices, acronym referring to a second generation mobile telephone digital standard. Among these devices is an HLR 5 (Home Location Register), which is a switching device. This HLR 5 includes means such as a database allowing it to store data relating to any user authorised to use the HPLMN network 7. These data relate to the user profile. They include mainly:

the IMSI number (International Mobile Subscriber Identity) which is a unique number stored in the SIM card of the mobile terminal, allowing a GSM or UMTS network to identify a user, the IMEI number (International Mobile Equipment Identity) which is an identification number specific to each mobile terminal, the location of the user, on the basis of the MSC/VLR addresses 3, 4, which provide the approximate location of the user at all times, the rights and services of the user, the authentication data, such as authentication algorithms, authentication keys, authentication triplets or quintuplets.

The HPLMN network 7 can, where applicable, include an Authentication Centre AuC which, when not included in the HLR 5, manages the authentication data mentioned above.

This HLR 5 provides a frame of reference for the other local databases, for example such as the VLR 3. On the other hand, the HPLMN network 7 comprises an SS7 message transfer device, called STP (semaphore transfer point).

The VPLMN network 7 also comprises an MSC 3 (Mobile services Switching Centre or Mobile Switching Centre). This MSC 3 is a switching device in charge of routing, interconnection with other networks (such as the conventional telephone network) and call coordination. It is very often associated with a VLR 4. This VLR 4 (Visited Location Register) is a GSM device which corresponds to a temporary database. In fact, this device contains all the data relating to a user located within its coverage zone, which were transmitted by the HLR 5. These data are used by the MSC 3 with which this VLR 4 is connected, and they essentially include the IMSI (International Mobile Subscriber Identity), the MSC address, the HLR address, the MSISDN (Mobile Subscriber Integrated Service Digital Number) and the data relating to the user's service. Hereinafter we will use MSC/VLR 3, 4 to refer to the visited switching device.

This VPLMN network 7 also comprises a buffer HLR 1. This buffer HLR 1 is an intermediate GSM device which has connection means between the HLR 5 of the HPLMN network 9 and the MSC/VLR 3, 4 of the VPLMN network 7. This intermediate device 1 or buffer HLR 1 includes:

an SS7 signalling interface module 19 for exchanges 25 with devices such as MSC/VLR 3,4, HLR 5 and STP 24;

an IP interface module 20 (Internet Protocol), for data exchanges 30 with devices 23 connected to IP networks, such as devices for third-generation mobile protocols, such as UMTS (Universal Mobile Telecommunications System) or HSDPA (High-Speed Downlink Packet Access), or monitoring devices;

one or several databases 2 for storing, among others, user data or various configuration tables;

a physical architecture 22 including, among others, one or several processors, volatile and non-volatile memories, and interface buses capable of making the system operate;

an application module comprising the operating system 21 on which software, including the analysis and service mechanisms of the buffer HLR 1, is installed.

The SS7 19 and IP 20 signalling interface modules are administered by the application module 21 by means of exchanges during phase 26, via the physical architecture 22 on which these two interfaces are connected and exchange data in phases 28, 29. The database 2 is administered in the same way by the application module 21, sending and receiving data by means of exchanges during phase 27. The buffer HLR 1 has different exchange protocols used by mobile networks, such as MAP (Mobile Application Part), and is capable, when updated, of using other exchange protocols. When a user equipped with a mobile terminal is within the coverage zone of a visited network cell, the user is tracked by the MSC/VLR 3, 4 managing the responsibility of this cell.

In a first step, the mobile terminal 6 sends a tracking request to the MSC/VLR 3, 4 with the IMEI and IMSI identifiers. The MSC/VLR 3, 4 reuses the IMSI to generate an authentication message. This authentication message makes it possible to verify the identity of the SIM card with the user's home operator. Once generated, this authentication message is sent to the buffer HLR 1. The buffer HLR 1 analyses this message and records in its database 2, among others, the IMSI and the transaction number (TCAP transaction number, which is a binary protocol of the SS7 network), before retransmitting this message to the HLR 5 belonging to the HPLMN network 9. Upon receiving this message, the HLR 5 performs a check.

If the user does actually belong to this HPLMN network 9, then the HLR 5 sends a positive authentication response to the buffer HLR 1. The data of this authentication request are then stored in the database 2 of the buffer HLR 1. It should be noted that in this step, all the data transmitted by the HLR 5 are stored in the buffer HLR 1, as would be done by the VLR 4, before being transmitted to the MSC/VLR 3, 4.

In a subsequent step, after authenticating the user, the MSC/VLR 3, 4 generates a tracking request message, which follows the same path as taken by the authentication message and passes through the same steps. Upon receiving the tracking message, the HLR 5 verifies that the user has the right to be tracked in roaming and then transmits to the buffer HLR 1 the data relating to the services and rights associated with the user. The buffer HLR 1 then stores all these elements and subsequently sends them to the MSC/VLR 3, 4. These data are stored by the MSC/VLR 3, 4 and the mobile telephone service is then activated. It should be noted that, for every exchange passing through the buffer HLR 1, the latter updates its database 2 with the data relating to the most recent exchanges.

In general terms, the buffer HLR 1 records in its database 2 the information relating to the user profile in the same way as the HLR 5 does for the authentication data, IMSI, MSISDN, VLR address, user rights, restrictions and other previously mentioned data. In the preceding embodiment, in the event of an incident occurring on the various HPLMN 9, VPLMN 7 or transport 8 networks, the HLR 5 can become unreachable. In such case, the buffer HLR 1 takes over.

Indeed, the buffer HLR 1 has the means required to perform all the authentication and tracking procedures as would be carried out by a HLR 5 or a MSC/VLR 3, 4. It can thus guarantee the continuity of a roaming service. In this situation, an additional step consists of periodically renewing the authentication and tracking requests sent by the MSC/VLR 3, 4 to the HLR 5 in order to restore the connection. The number of attempts can be configured, but is generally around five. In this case, the buffer HLR 1 replaces the HLR 5 of the HPLMN network 9, responding to the MSC/VLR 3, 4 with the data previously stored during exchanged with the HLR 5 for this user. It is also possible in this context to define the application parameters relating to a category of users, or to the provision of a service, restricted or otherwise. It is also possible to define the period during which the buffer HLR 1 can replace the HPLMN network 9 and many other parameters. This mechanism can be applied to a user who has already been tracked on the VPLMN network 7 by reusing its profile received from the HLR 5 recorded in the database 2 of the buffer HLR 1 or to an unknown user of this network, by applying to the latter a default profile with greater or fewer restrictions and skipping the phase of authenticating the user with the MSC/VLR 3, 4.

In another embodiment of the invention, the HPLMN network 9 can be made unreachable by receiving negative responses supplied during the tracking step. These responses can come from traffic redirection systems based on the manipulation of SS7 messages, such as, for example, tracking refusals with an error message "unexpected data value" (Message standardised in standard ETSI TS 029.002). In this context, the authentication step can be carried out normally with the HLR 5. In such a case, there exists a step of the buffer HLR 1 renewing authentication and tracking demand requests. The time separating the rejection and the renewal of these requests can be configured. This time is generally around eighteen seconds. This time can be configured to simulate manual tracking or a unique coverage zone of a VPLMN 7. On the other hand, the buffer HLR 1 can be configured so that, in certain cases, it reconstructs and sends tracking messages from the elements of its database such as the IMSI and the address of the MSC/VLR 3, 4. One of the configurations that can be applied is that of changing the addressing plan by replacing plan E.214 with E.164 of the SCCP protocol (Signalling Connection and Control Part). The aim of this is to avoid the mode of routing tracking messages of the HPLMN 9 of its redirection system and to connect directly to the HLR 5 of the HPLMN 9. In this way, it is possible to connect to the HLR 5 and the authentication and tracking steps are performed. The user then receives a mobile telephone offer and thus continuity of service.

Figure 2:
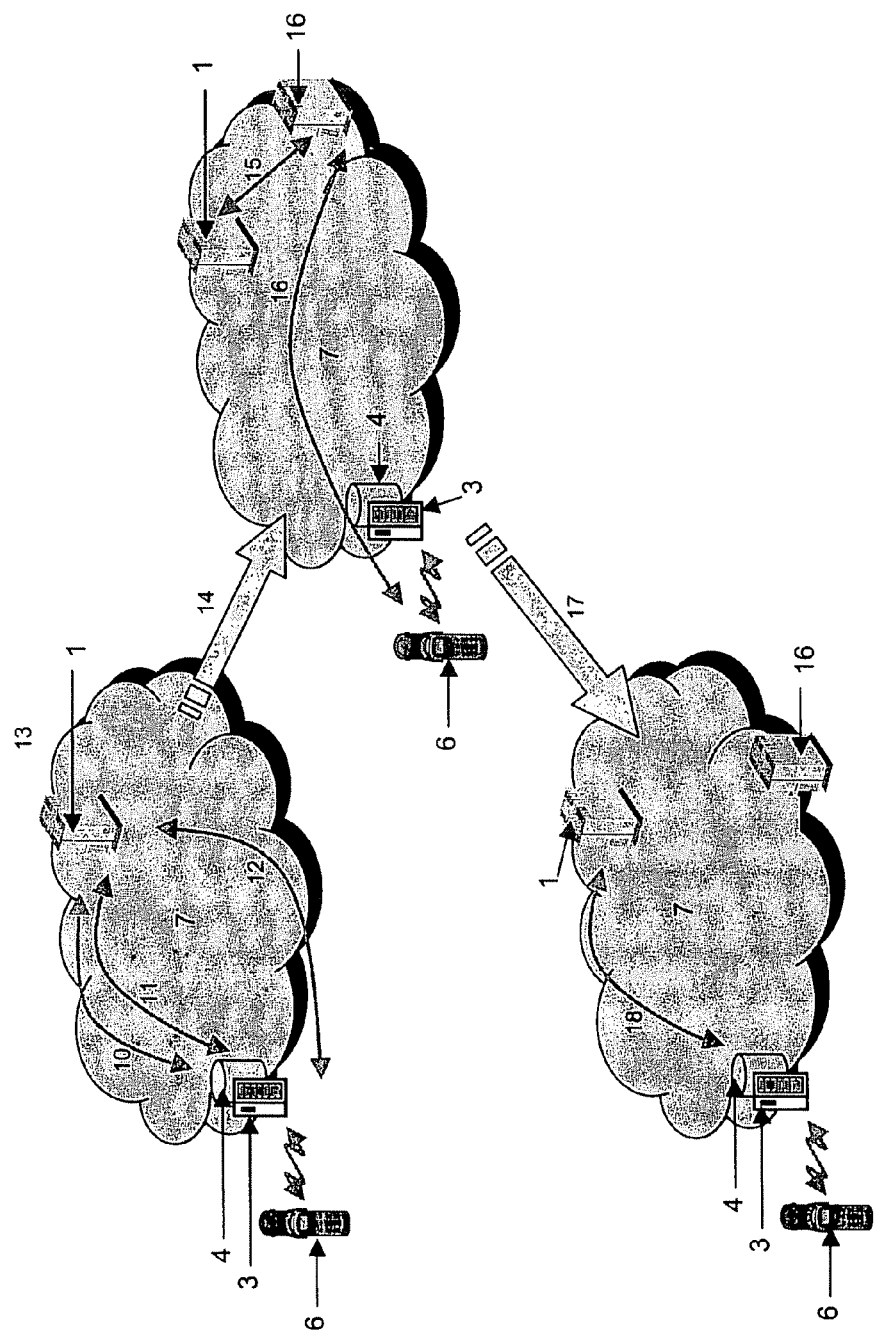
FIG. 2 depicts one embodiment of the invention.
Figure 3:
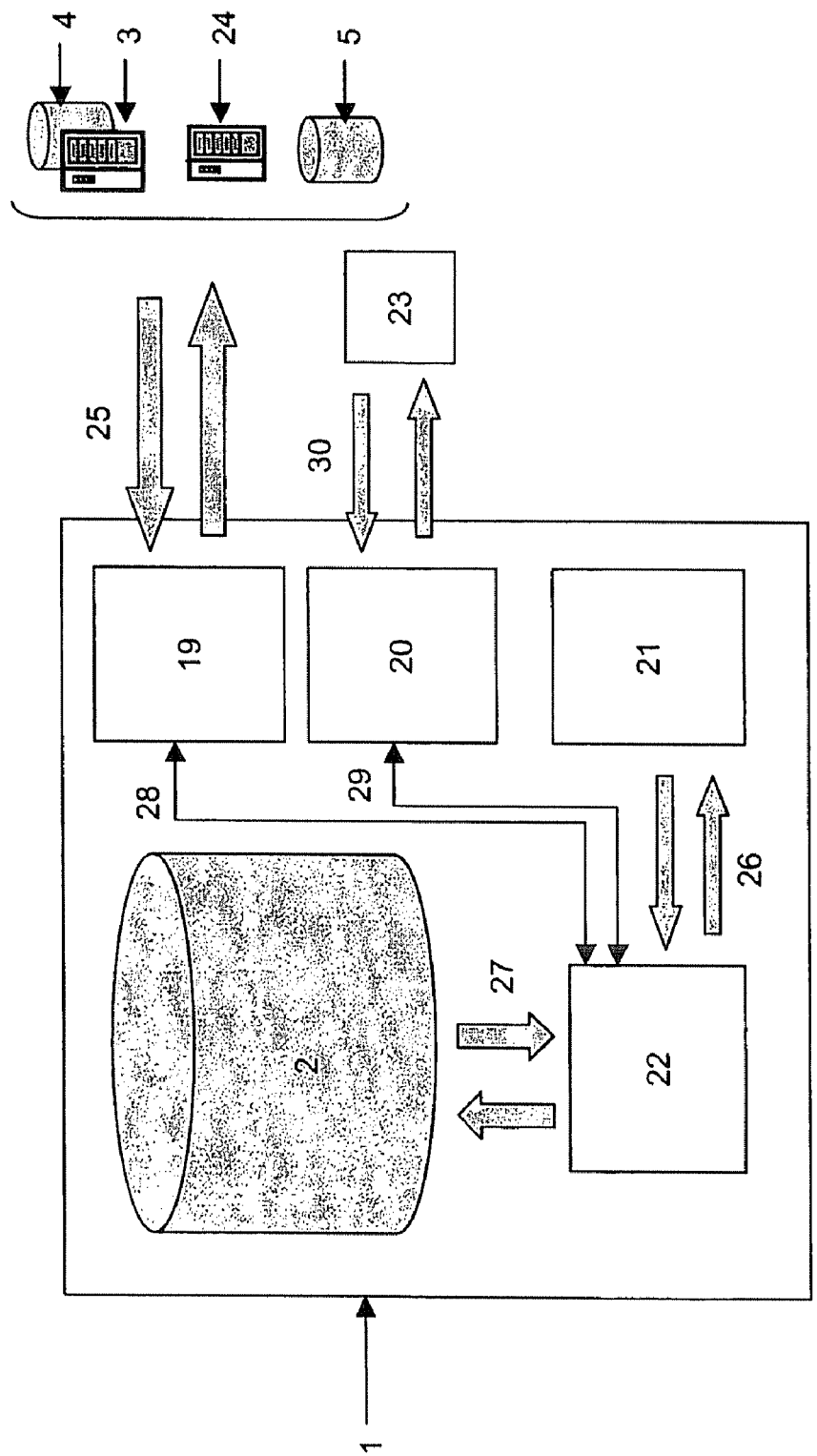
FIG. 3 shows the intermediate switching device, the buffer HLR.

In FIG. 2, another embodiment of the invention is described. It relates to a situation in which it is impossible to connect to the HPLMN network and the authentication and tracking steps are not completed. The buffer HLR 1 can authorise the connection of a mobile terminal 6 on the basis of the IMEI and IMSI numbers recovered by the MSC/VLR 3, 4. In this case, the authentication phase becomes inexistent. The MSC/VLR 3, 4 requests tracking directly from the buffer HLR 1 in phase 10. The latter accepts the tracking with restriction of all services in phase 11, except reception of SMS. The buffer HLR 1 obtains the IMEI of the mobile terminal 6 in phase 12, either directly in the tracking request of the MSC/VLR 3, 4 or by querying the MSC/VLR 3, 4 with a suitable MAP protocol message, such as "Provide Subscriber Info". These IMSI and IMEI identifier numbers are recorded in its database 2 in phase 13 and allow it to activate the service in phase 14, on the basis of these two elements. The buffer HLR 1 sends an SMS (Short Messaging Service) via an interconnection with a device that manages the transfer of these messages, the SMS-C 16 (Short Message Service Centre), in phase 15. The user receives the SMS indicating the process to be followed to subscribe to the service in phase 16. After subscribing and activating the service in phase 17, the buffer HLR 1 updates the data of the VLR 5 in phase 18, lifting the restrictions and assigning it an MSISDN in a slot of the VPLMN network 7 and a profile corresponding to the subscribed service. The user can then be offered a provisionally assigned telephone number and can therefore receive and send calls and SMS. The user thus benefits from continuity of roaming service.

Figure 4:
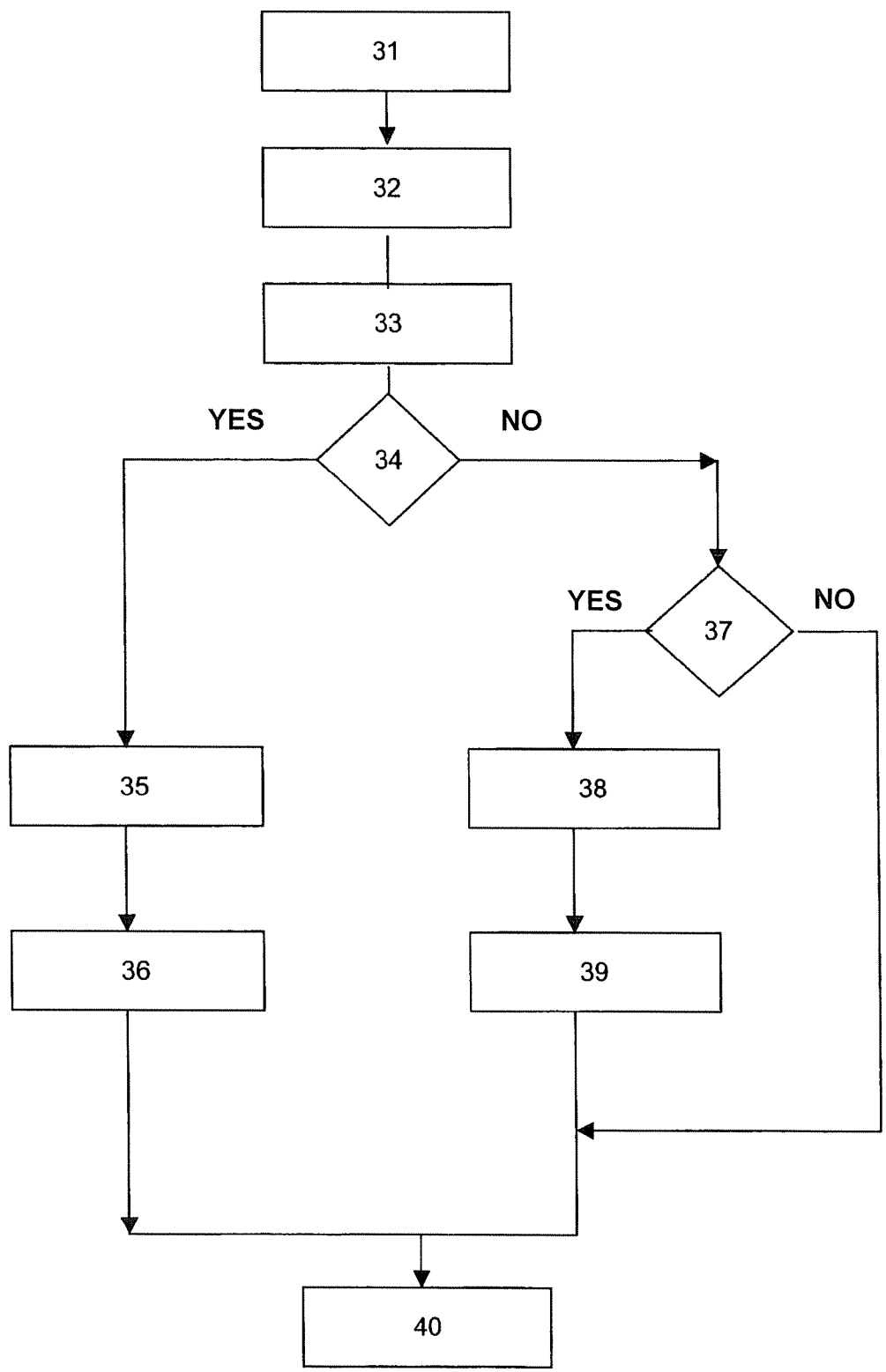
FIG. 4 depicts one operating mode of the invention.

In FIG. 4, during the reception step 31, the intermediate device 1 receives data from the visited switching device 3, 4. These data are recorded in the database 2 of this intermediate device 1 in the recording step 32. On the basis of these data, it sends a request to the home switching device 5 in the step of sending a request 33. In the event of an authentication failure 34 by the home switching device 5, the intermediate device 1 analyses the data it received in the step of analysing received data 35 and authorises the authentication of the user in the step of authorising authentication 36 with greater or fewer restrictions depending on the results of the data analysis. If, on the other hand, authentication is successful but tracking 37 fails in the home switching device 5, a step of analysing the data 38 received by the intermediate device 1 is performed, followed by a tracking authorisation step 39. After the steps 39 and 36 and when no tracking failure occurs, the intermediate switching device 1 supplies the visited switching device 3, 4, in step 40, with an authorisation to connect the user to the visited network.

In this way, the user can be systematically tracked from the buffer HLR and thus receive various mobile telephone services. The invention is understood to be applicable to all types of mobile telephone networks, in particular networks that use GPRS (General Packet Radio Service), UTMS or HSDPA communication protocols.

The invention claimed is:

1. A method of operating an intermediate device within a network architecture, the network architecture comprising a home network and a visited network, the visited network comprising a visited switching device and the intermediate device, the home network comprising a home switching device, the visited switching device being configured to (i) receive data from a user in the visited network and (ii) transmit the data to the home switching device, the home switching device being configured to (i) record the data and (ii) authenticate and track the user based on the data, the method comprising:

receiving the data from the visited switching device;
recording the data;
sending a request to the home switching device based on the data supplying the visited switching device with an authorization to connect the user to the visited network;
receiving, from the home switching device, an authentication response to the request;
storing authentication data from the authentication response; and
transmitting a message based on the authentication response to the visited switching device.

2. The method according to claim 1 further comprising, in response to an authentication failure by the home switching device following the request:

analyzing the data received by the intermediate device; and
authorizing the authentication.

3. The method according to claim 1 further comprising, in response to a tracking failure by the home switching device following the request:

analyzing the data received by the intermediate device; and
authorizing the tracking.

4. The method of claim 1, further comprising updating the authentication data based on exchanges between the visited switching device and the home switching device.

5. The method of claim 1, further comprising, when the home switching device is unreachable by the intermediate device, responding to an authentication request from the user with the stored authentication data.

6. The method of claim 1, further comprising, when the home switching device is unreachable by the intermediate device, responding to an authentication request from a new user with default authentication data.

7. A method of operating an intermediate device within a network architecture, the network architecture comprising a home network and a visited network, the visited network comprising a visited switching device and the intermediate device, the home network comprising a home switching device, the visited switching device being configured to (i) receive data from a user in the visited network and (ii) transmit the data to the home switching device, the home switching device being configured to (i) record the data and (ii) authenticate and track the user based on the data, the method comprising:

receiving the data from the visited switching device;
recording the data;
sending a request to the home switching device based on the data supplying the visited switching device with an authorization to connect the user to the visited network;
subsequent to supplying the authorization, receiving a tracking request message;
transmitting a tracking message to the home switching device based on the tracking request message;
receiving a response to the tracking message from the home switching device; and
storing tracking information from the response.

8. The method of claim 7, further comprising periodically renewing (i) data related to the authorization and (ii) the tracking information with the home switching device.

9. The method according to claim 7 further comprising, in response to an authentication failure by the home switching device following the request:

analyzing the data received by the intermediate device; and
authorizing the authentication.

10. The method according to claim 7 further comprising, in response to a tracking failure by the home switching device following the request:

analyzing the data received by the intermediate device; and
authorizing the tracking.

11. A method of operating an intermediate device within a network architecture, the network architecture comprising a home network and a visited network, the visited network comprising a visited switching device and the intermediate device, the home network comprising a home switching device, the visited switching device being configured to (i) receive data from a user in the visited network and (ii) transmit the data to the home switching device, the home switching device being configured to (i) record the data and (ii) authenticate and track the user based on the data, the method comprising:

receiving the data from the visited switching device;
recording the data;
sending a request to the home switching device based on the data;
supplying the visited switching device with an authorization to connect the user to the visited network;
receiving a connection request from a new user via the visited switching device; and
responding to the connection request by skipping an authentication phase and applying a default profile.

12. The method according to claim 11 further comprising, in response to an authentication failure by the home switching device following the request:

analyzing the data received by the intermediate device; and
authorizing the authentication.

13. The method according to claim 11 further comprising, in response to a tracking failure by the home switching device following the request:

analyzing the data received by the intermediate device; and
authorizing the tracking.

* * * * *